(12) United States Patent
Goto

(10) Patent No.: US 10,157,112 B2
(45) Date of Patent: Dec. 18, 2018

(54) STORAGE DEVICE

(71) Applicant: Toshiba Memory Corporation, Minato-Ku, Tokyo (JP)

(72) Inventor: Masataka Goto, Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 76 days.

(21) Appl. No.: 15/060,035

(22) Filed: Mar. 3, 2016

(65) Prior Publication Data

US 2017/0068605 A1 Mar. 9, 2017

Related U.S. Application Data

(60) Provisional application No. 62/214,158, filed on Sep. 3, 2015.

(51) Int. Cl.
 *G06F 11/00* (2006.01)
 *G06F 11/20* (2006.01)
 *G06F 3/06* (2006.01)

(52) U.S. Cl.
 CPC ........ *G06F 11/2094* (2013.01); *G06F 3/0604* (2013.01); *G06F 3/067* (2013.01); *G06F 3/0619* (2013.01); *G06F 3/0653* (2013.01); *G06F 3/0659* (2013.01); *G06F 3/0685* (2013.01); *G06F 2201/805* (2013.01)

(58) Field of Classification Search
 CPC ............ G06F 11/2094; G06F 11/2053; G06F 11/2056; G06F 11/2058; G06F 11/2064; G06F 3/0604; G06F 3/0619; G06F 3/0653; G06F 3/0659; G06F 3/067; G06F 3/0685; G06F 3/0646; G06F 2201/805
 See application file for complete search history.

(56) References Cited

U.S. PATENT DOCUMENTS

| | | | |
|---|---|---|---|
| 7,827,439 B2 | 11/2010 | Mathew et al. | |
| 7,904,746 B2 | 3/2011 | Nakamura et al. | |
| 2010/0312958 A1* | 12/2010 | Sakai | G06F 11/0727 711/112 |
| 2013/0138604 A1* | 5/2013 | Ozawa | H04L 67/1097 707/609 |
| 2015/0135004 A1* | 5/2015 | Kobashi | G06F 3/067 714/6.3 |
| 2016/0170846 A1* | 6/2016 | Hands | G06F 11/1662 714/6.3 |
| 2016/0342342 A1* | 11/2016 | Kan | G06F 12/0802 |
| 2018/0018231 A1* | 1/2018 | Okada | G06F 3/0619 |

FOREIGN PATENT DOCUMENTS

JP 2010-134788 A 6/2010

\* cited by examiner

*Primary Examiner* — Bryce P Bonzo
*Assistant Examiner* — Anthony J Amoroso
(74) *Attorney, Agent, or Firm* — White & Case LLP

(57) ABSTRACT

According to one embodiment, a storage device includes a storage configured to store data and a controller configured to control the storage. When receiving an instruction to read data from the storage is received, the controller determines whether or not a failure is in the storage device which is a target of the data read. When a failure is acknowledged, the controller refers to a different storage device storing the data including the same data as the data, acquires the same data from the different storage device, and outputs the acquired data to a source of the instruction.

15 Claims, 17 Drawing Sheets

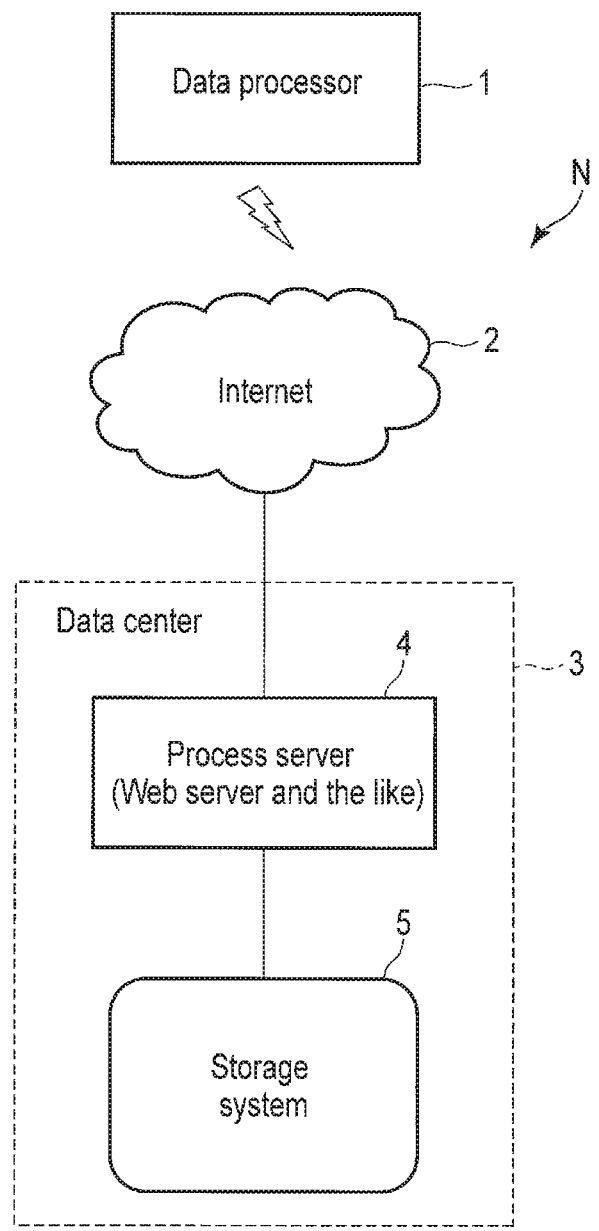
F I G. 1

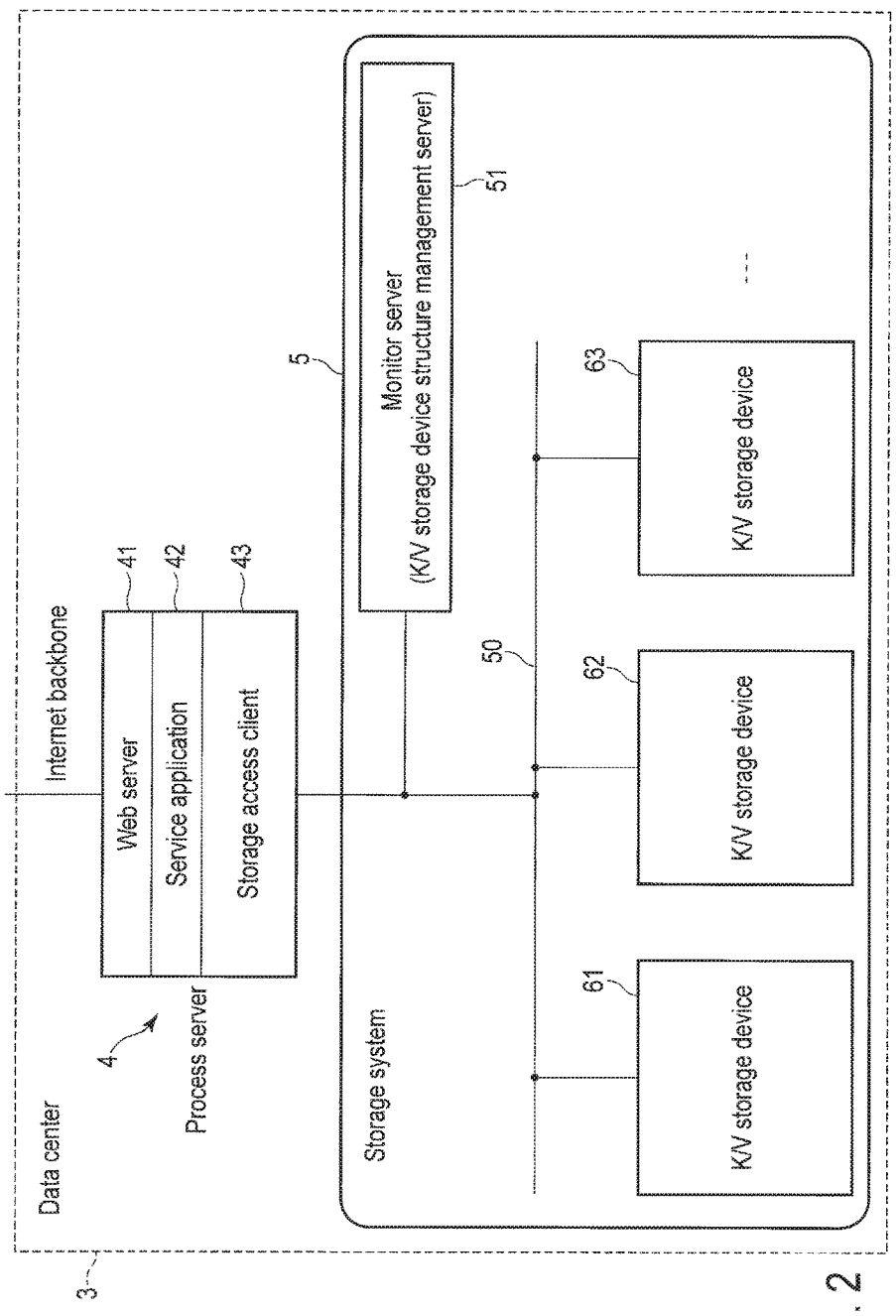
F I G. 2

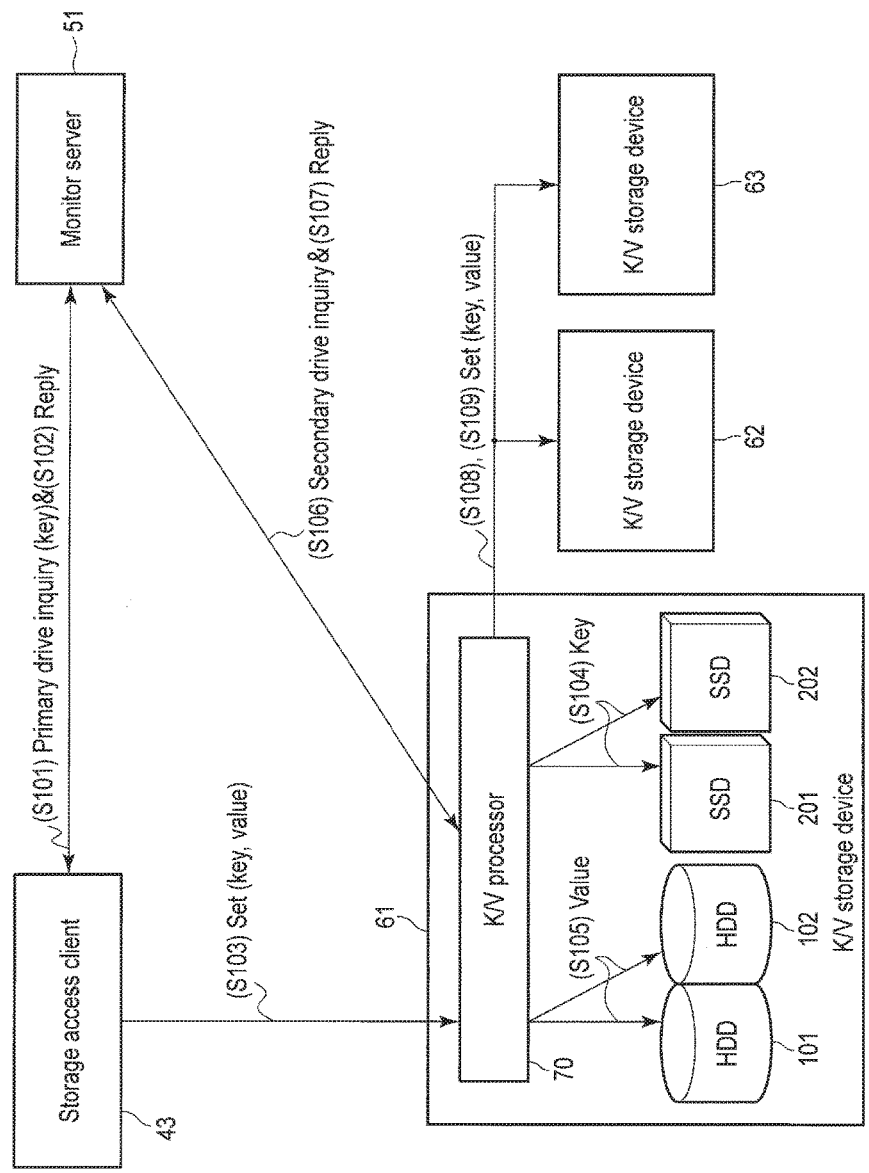
F I G. 3

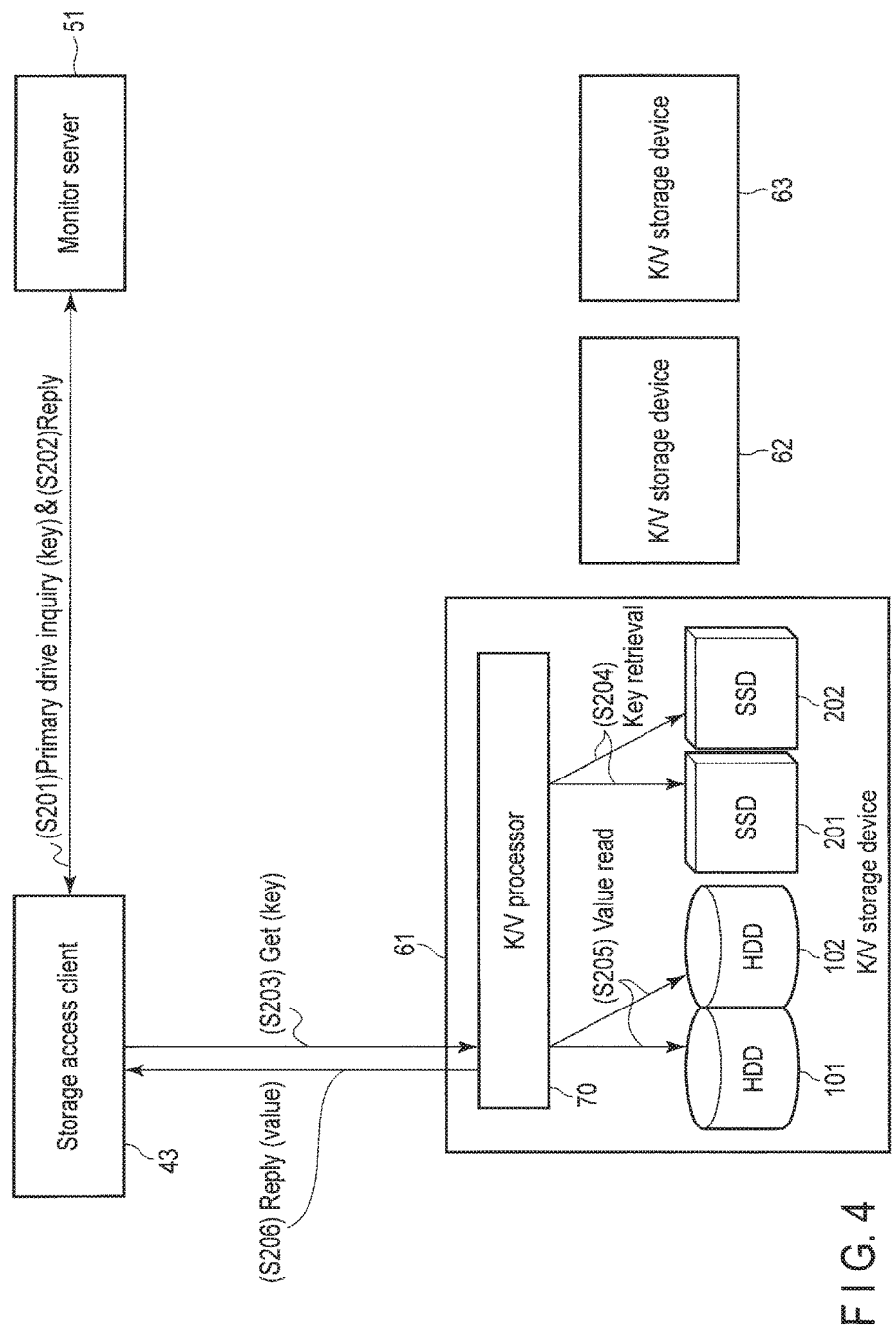
F I G. 4

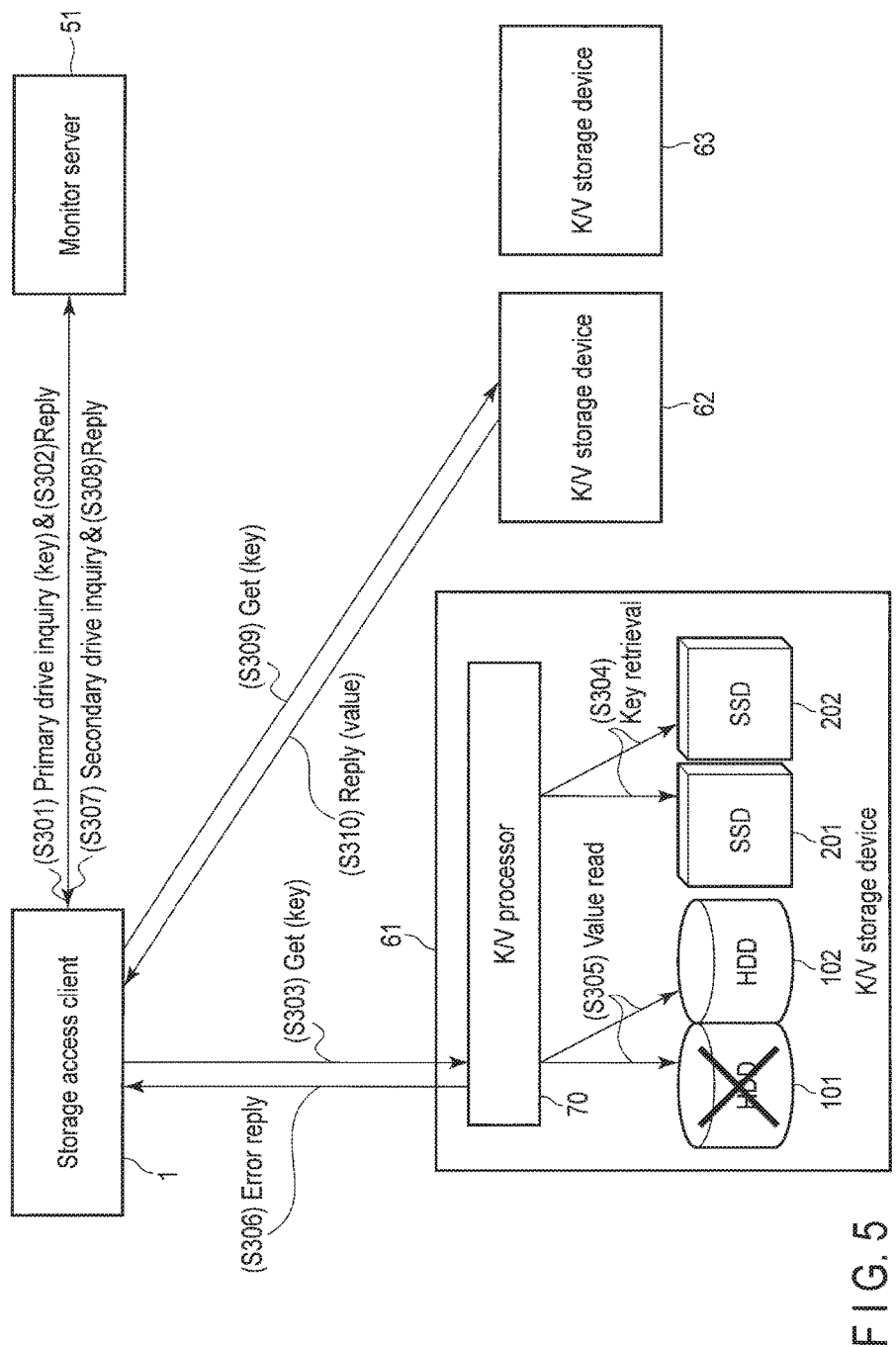
F I G. 5

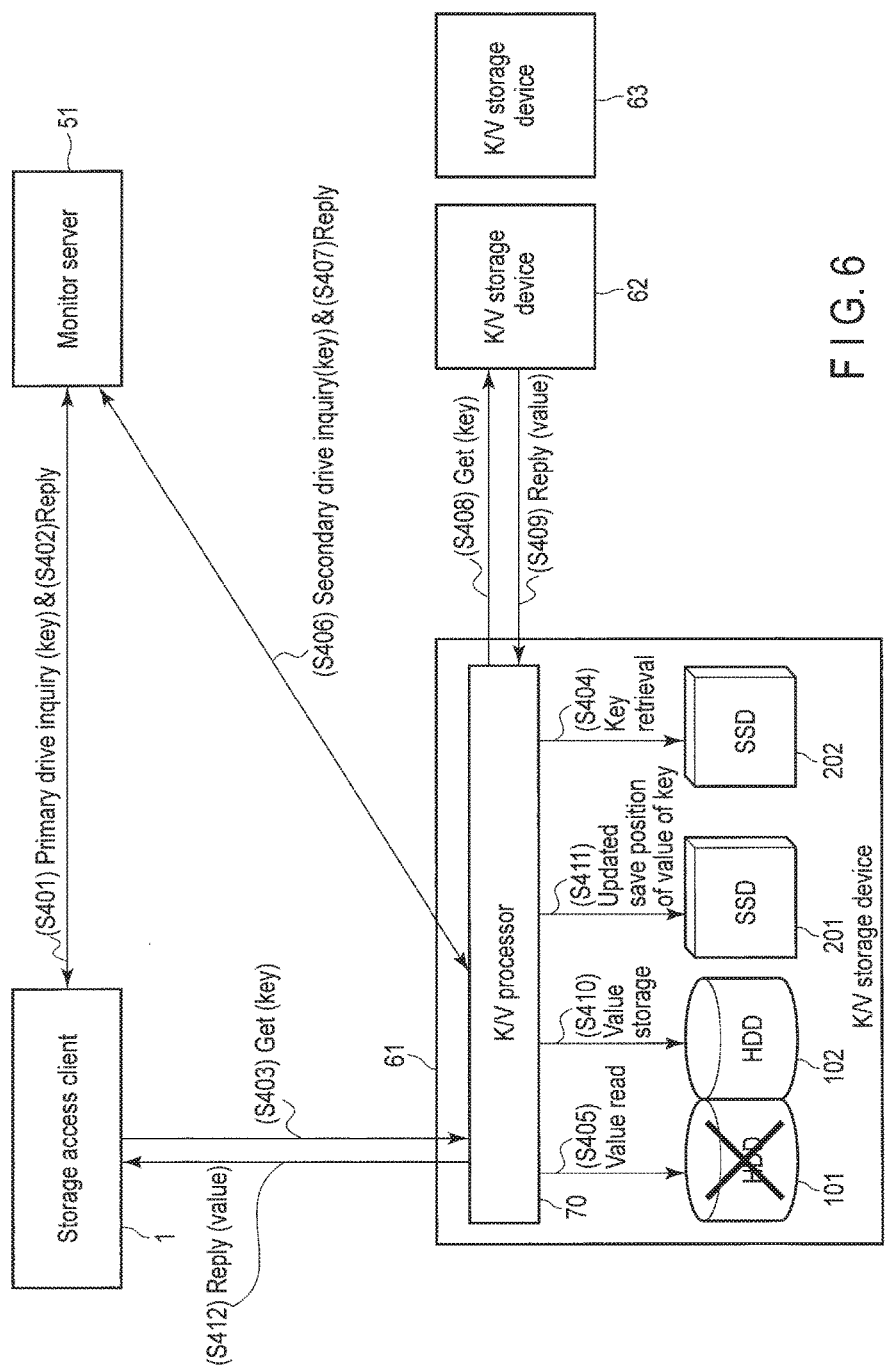
F I G. 6

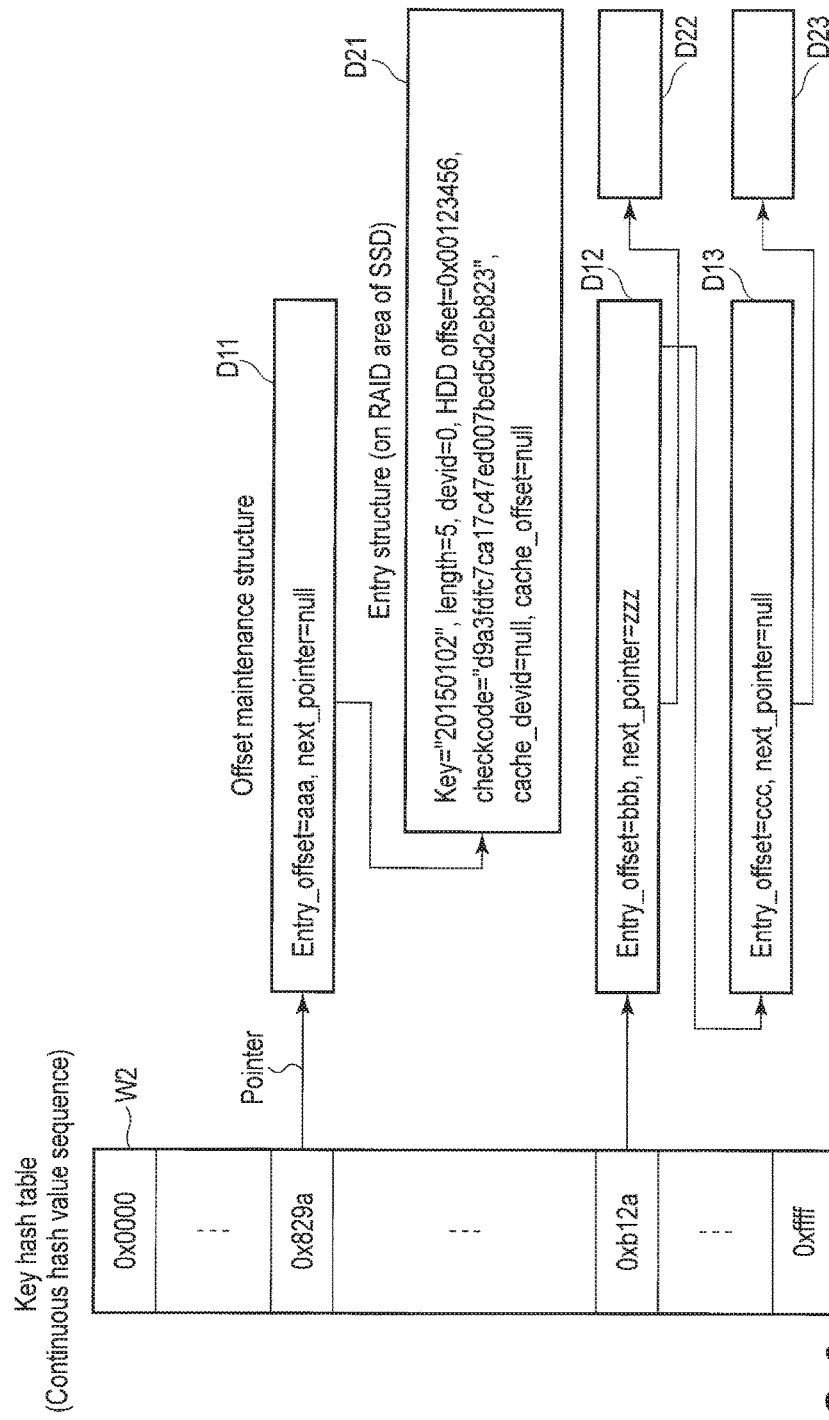
F I G. 9

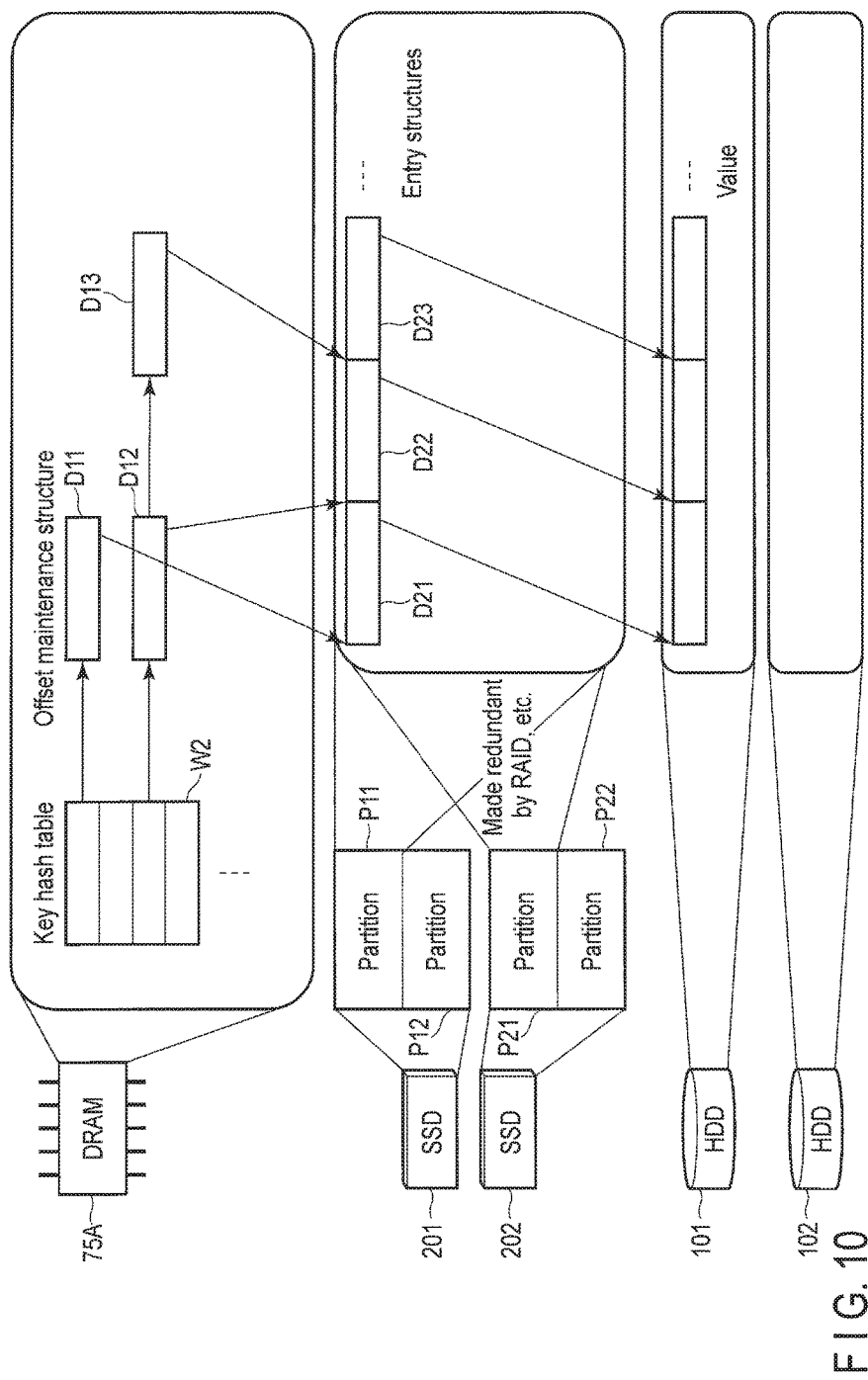
F I G. 10

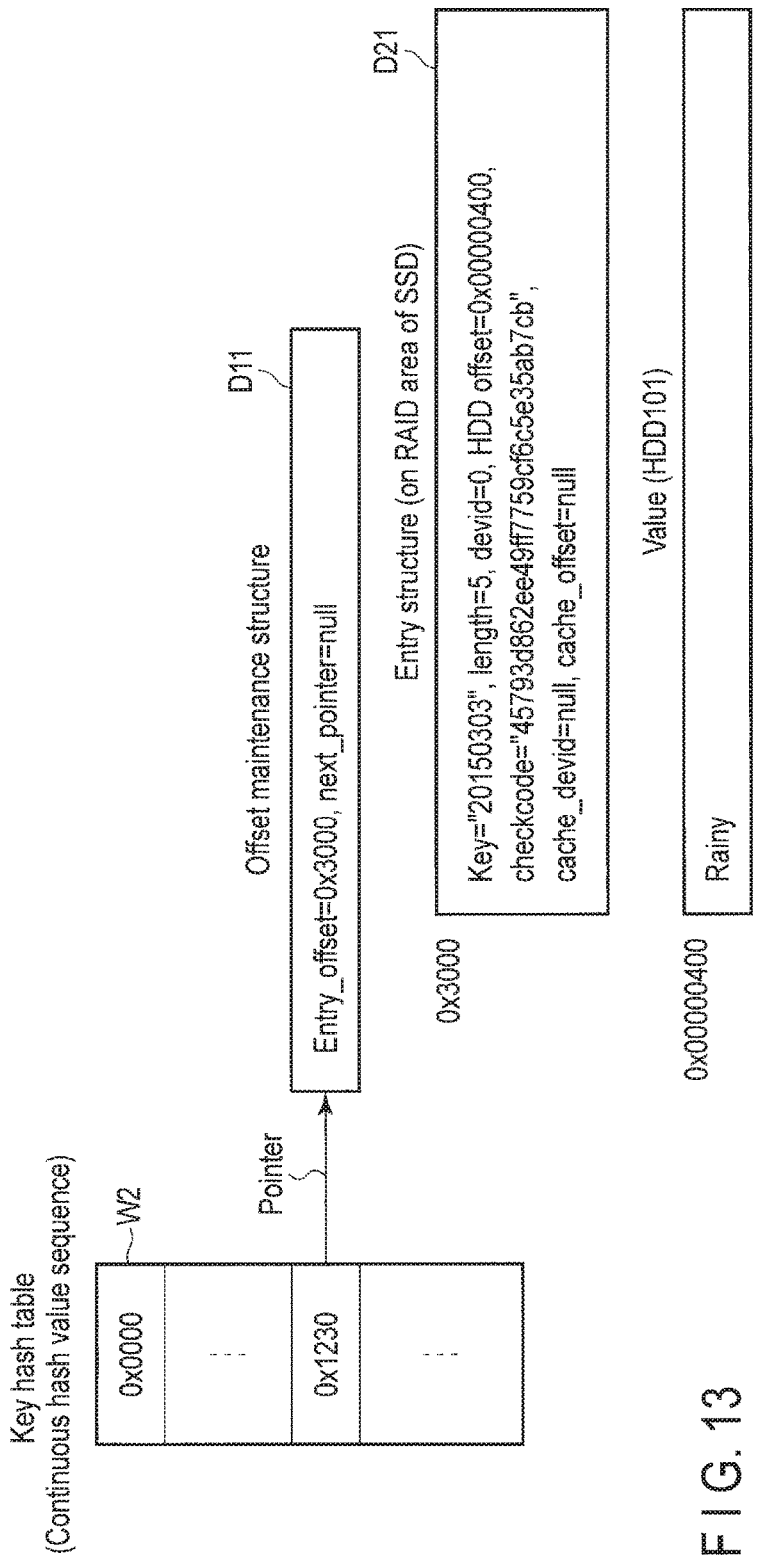
F I G. 13

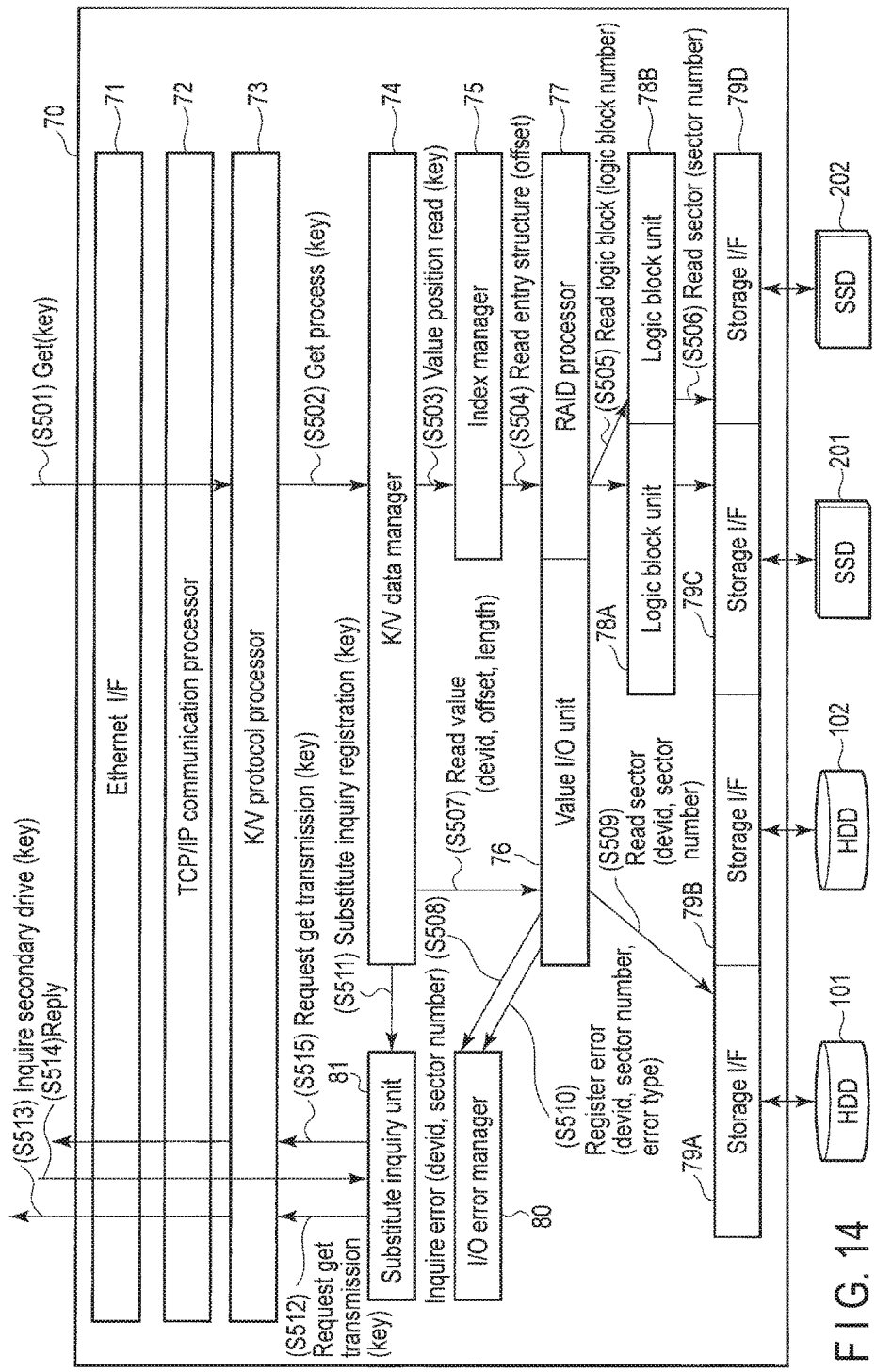
F I G. 14

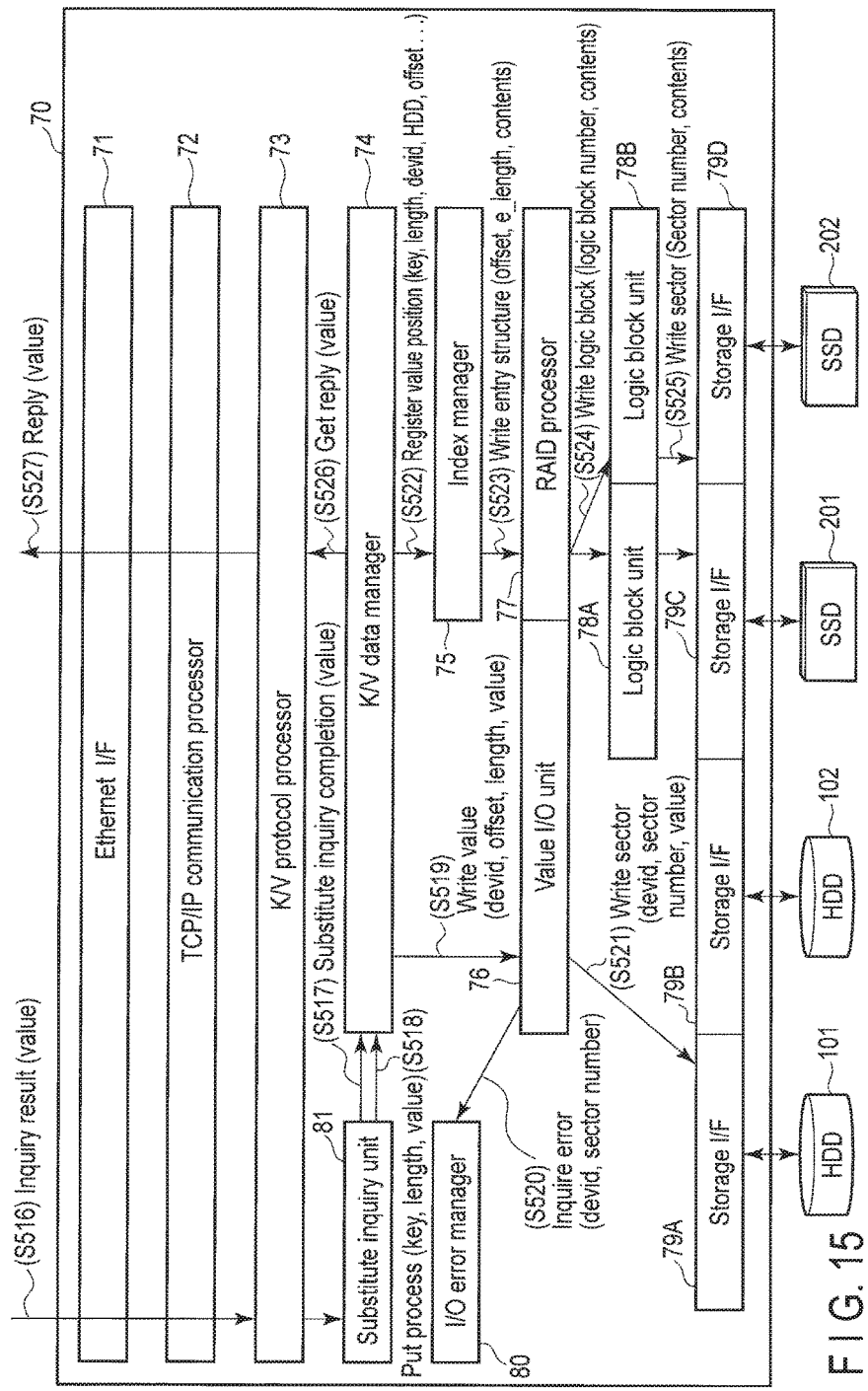
F I G. 15

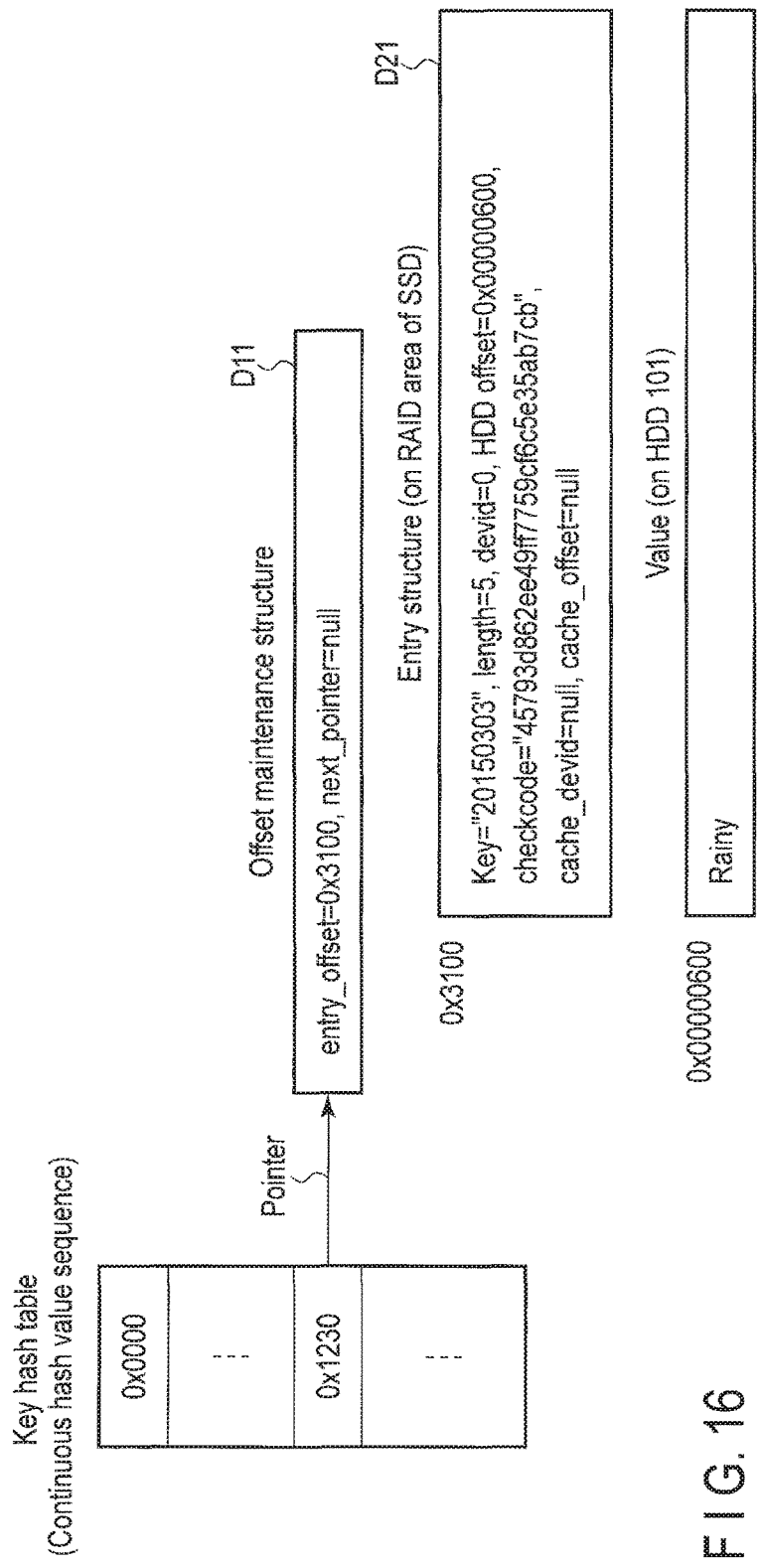
F I G. 16

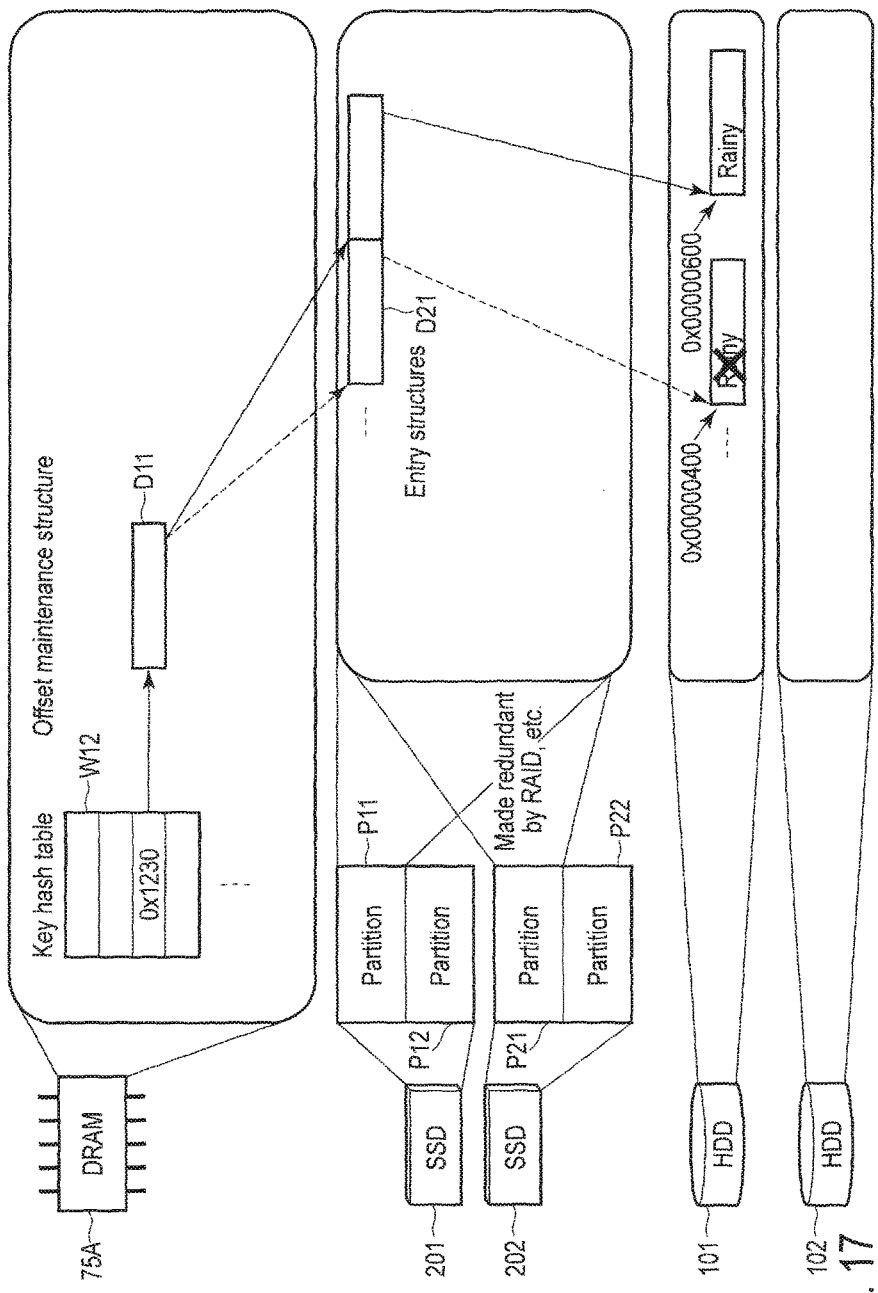
F I G. 17

STORAGE DEVICE

CROSS-REFERENCE TO RELATED APPLICATIONS

This application claims the benefit of U.S. Provisional Application No. 62/214,158, filed Sep. 3, 2015, the entire contents of which are incorporated herein by reference.

FIELD

Embodiments described herein relate generally to a storage device.

BACKGROUND

There is a well-known technique related to data storage devices to stop the data feed when a failure occurs therein. In this case, the data will be supplied from a different storage device storing the same data.

BRIEF DESCRIPTION OF THE DRAWINGS

FIG. 1 is an example of a schematic structure of a network system of an embodiment.

FIG. 2 is an example of a schematic structure of a process server and a storage system of the embodiment.

FIG. 3 shows an example of a set operation of the embodiment.

FIG. 4 shows an example of a get operation of the embodiment.

FIG. 5 shows an example of a first get operation of the embodiment, which is performed if a primary drive has failed.

FIG. 6 shows an example of a second get operation of the embodiment, which is performed if a primary drive has failed.

FIG. 9 shows an example of a key hash table of the embodiment.

FIG. 10 shows an example of a relationship between various management data, values, and storage locations of these items in the embodiment.

FIG. 13 shows an example of a data management structure in an initial state of the second get operation of the embodiment.

FIG. 14 shows an example of processes performed by a controller, the processes starting from receiving of a get (key) from a storage access client to performing a substitute inquiry.

FIG. 15 shows an example of processes performed by the controller, the processes starting from receiving a value using a result of the substitute inquiry to sensing the value to the storage access client.

FIG. 16 shows an example of a data management structure at the time of the second get operation of the embodiment.

FIG. 17 shows an example of a data arrangement at the time of the execution of the second get operation of the embodiment.

DETAILED DESCRIPTION

Figure 7:
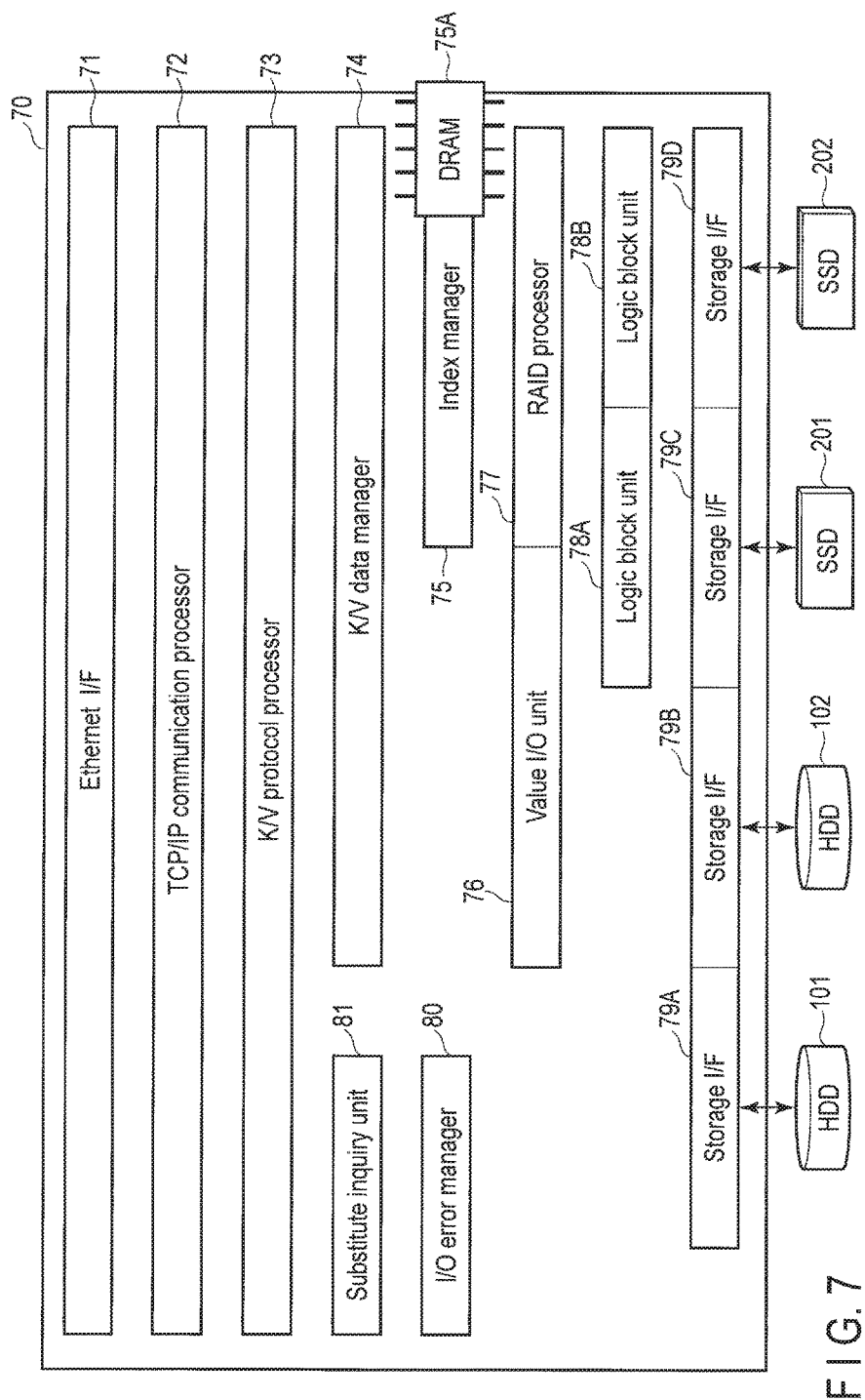
FIG. 7 shows an example of the internal structure of a controller of the embodiment.

Various embodiments will be described hereinafter with reference to the accompanying drawings.

In general, according to one embodiment, a storage device includes a storage configured to store data (such as a value) and a controller configured to control the storage. When an instruction to read data from the storage is received, the controller determines whether or not a failure is in the storage device which is a target of the data read. When a failure is acknowledged, the controller refers to a different storage device storing data including the same data as the data, acquires the same data from the different storage device, and outputs the acquired data to a source of the instruction.

In the present application, if an element is referred to by different terms, it is simply for the sake of exemplification and no limitation is intended thereby. Such an element may be referred to by other different terms. Furthermore, if an element is referred to by a certain term, such an element may also be referred to by other different terms.

Hereinafter, embodiments will be explained with reference to accompanying drawings.

FIG. 1 shows an example of a schematic structure of a network system N of an embodiment.

As shown in FIG. 1, the network system N includes a data processor (storage access client) 1, Internet 2, and data center 3. The data center 3 includes a process server 4 and a storage system 5 which is connected to the process server 4.

The data processor 1 is, for example, a network device used by a user. Specifically, the data processor 1 may be a smartphone, a tablet computer, or the like. The data processor 1 is connected to the Internet 2 through a TCP/IP connection such as a wireless local area network (LAN) or a Long Term Evolution (LTE) cellular network. Note that, although the present embodiment adopts wireless connection between the data processor 1 and the Internet 2, the connection between the data processor 1 and the Internet 2 may be wired.

If the data center 3 receives a predetermined command from the data processor 1 through the Internet 2, the data center 3 performs a process corresponding to the predetermined command, and sends a process result to the data processor 1 through the Internet 2. For example, if the data center 3 receives a data transmission request from the data processor 1, the data center 3 performs a read process to reach the data from a predetermined storage unit and transmits the read data to the data processor 1.

Furthermore, the data center 3 is connected to the Internet 2 through a backbone connection. The backbone connection is a connection used to connect the data center 3 to the Internet through an internet exchange or the like.

As described above, the data center 3 includes the process server 4 and the storage system 5. The process server 4 and the storage system 5 are connected through, for example, a TCP/IP network established by Ethernet or the like.

The process server 4 is a server used for the connection of the data processor 1 and the data center 3.

The storage system 5 includes a plurality of storage units and stores data (values). Here, the storage unit may be a solid-state drive (SSD) or a hard disk drive (HDD) in the present embodiment.

FIG. 2 shows an example of a schematic structure of the process server 4 and the storage system 5 of the present embodiment.

As shown in FIG. 2, the process server 4 includes a web server 41, service application 42, and storage access client 43.

The web server 41 accepts a connection request from the data processor 1.

The service application 42 performs a process corresponding to a predetermined request from the data processor 1.

The storage access client 43 performs a process by which the service application 42 accesses the data stored in the storage system 5.

The storage system 5 includes a monitor server 51, a plurality of key value storage devices (hereinafter referred to as K/V storage devices) 61, 62, 63 . . . and K/V storage devices 61, 62, 63 . . . and the monitor server 51 are connected individually through a network 50.

K/V storage device 61 stores data. K/V storage device 61 is a storage device which stores a key indicative of a data ID (first data) and a value as the data substance (second data) as a pair (key/value pair). That is, the value is associated with the key. K/V storage devices 62 and 63 are structured the same.

The monitor server 51 is a server which manages a key structure indicative of which K/V storage device stores the data corresponding to at least a predetermined key (K/V storage device structure management server).

In the present embodiment, the storage system 5 includes a plurality of K/V storage devices storing the same key/value pairs.

Specifically, in this system, K/V storage device 61 functions as a primary drive, and K/V storage device 62 and K/V storage device 63 function as secondary drives. The primary drive is a K/V storage device to which the storage access client 43 should primarily access. The secondary drives are used when the primary drive is not accessible. That is, K/V storage devices 62 and 63 each function as a backup drive of K/V storage device 61.

Note that, although two secondary drives of K/V storage devices 62 and 63 are used in the present embodiment, only one or three or more secondary drives may be used instead.

Now, amongst the storage access basic operations of the storage access client 43 with respect to K/V storage device 61, an example of a set operation is explained. Here, the term "set" means an operation of the storage access client 43 by which data are stored in K/V storage device 61. FIG. 3 shows an example of the set operation.

Firstly, a schematic structure of K/V storage device 61 is explained. As shown in FIG. 3, K/V storage device 61 includes a K/V processor (controller) 70, HDD 101, HDD 102, SSD 201, and SSD 202. In the present embodiment, a first storage is composed of SSD 201 and SSD 202, and a second storage is composed of HDD 101 and HDD 102. Furthermore, a data read speed by SSDs 201 and 202 is a first speed and a data read speed by HDDs 101 and 102 is a second speed which is faster than the first speed.

Note that, in the present embodiment, the first storage includes SSD 201 and SSD 202 and the second storage includes HDD 101 and HDD 102; however, no limitation is intended thereby. The first storage may include a single SSD or may include three or more SSDs. Furthermore, the second storage may include a single HDD or may include three or more HDDs. Furthermore, the number of SSDs in the first storage may be different from the number of HDDs in the second storage.

Furthermore, the KV processor 70 includes, for example, a CPU, ROM, and RAM, and ROM stores a program to perform each process described later. CPU unfolds the program stored in ROM in RAM and executes the program unfolded in RAM to perform each process described later. Note that each process performed by CPU may partly or entirely be performed by a circuit instead.

The K/V processor 70 is a processor which performs a command from the storage access client 43.

SSD 201 and SSD 202 store the key. Note that SSD 201 and SSD 202 are redundant. That is, SSD 201 and SSD 202 store the same key (first data).

HDD 101 and HDD 102 store the value associated with the key.

Note that, although K/V storage device 61 includes two SSDs 201 and 202 and two HDDs 101 and 102 in the present embodiment, the number of SSDs and the number of HDDs are not limited thereto.

Furthermore, although the specific depiction is omitted, K/V storage devices 62 and 63 are structured the same as K/V storage device 61.

Therefore, the data stored in SSD 201 and SSD 202 of K/V storage device 61 are copied in the two backup SSDs of each of K/V storage devices 62 and 63, and the data stored in HDD 101 and HDD 102 of K/V storage device 61 are copied in the two backup HDDs of each of K/V storage devices 62 and 63. That is, in the present embodiment, the data stored in SSD 201 and SSD 202 of K/V storage device 61 are not secured in the two backup HDDs of K/V storage device 62 or 63, and the data stored in HDD 101 and HDD 102 of K/V storage device 61 are not secured by the two backup SSDs of K/V storage device 62 or 63.

Next, an example of the set operation is explained.

The storage access client 43 has a key/value pair of a key to be stored in K/V storage device 61 and a value associated with the key.

The storage access client 43 initially sends a primary drive inquiry to the monitor server 51 to specify the K/V storage device in which the key/value pair should be stored (S101). The key is used as a parameter of this inquiry.

Using the key structure managed therein, the monitor server 51 retrieves the primary drive storing the key transmitted from the storage access client 43 in the K/V storage devices of the storage system 5.

Then, the monitor server 51 sends primary drive data which specify the retrieved primary drive (specification data) to the storage access client 43. In the present embodiment, the primary drive data are used to specify K/V storage device 61 in the storage system 5. Specifically, the primary drive specification data include a host name or an IP address. Furthermore, the primary drive specification data may add a TCP port number or World Wide Name to the host name or the IP address, if necessary.

Then, the storage access client 43 receives a reply to the inquiry (primary drive data) from the monitor serve 51 (S102). Based on the primary drive data, the storage access client 43 acknowledges that a K/V storage device of access target is K/V storage device 61.

Then, the storage access client 43 sends a set of key and value as a set instruction to K/V storage device 61 (S103).

Based on the set of key and value from the storage access client 43, the K/V processor 70 of K/V storage device 61 stores the key in each of SSD 201 and SSD 202 (S104) and stores the value in HDD 101 or HDD 102 (S105). Here, the key stored in SSD 201 and SSD 202 is stored in an entry structure format described later. The key will be specified later.

Then, the K/V processor 70 sends a secondary drive inquiry to the monitor server 51 to specify a backup K/V storage device which secures the stored key/value pair (S106).

Based on the inquiry from the K/V processor 70, the monitor server 51 retrieves the backup K/V storage device (secondary drive) to secure the value of K/V storage device 61 from predetermined management data. Furthermore, the monitor server 51 sends the retrieved secondary drive data to K/V storage device 61. In the present embodiment, the secondary drive data are used to specify K/V storage devices 62 and 63 in the storage system 5.

Then, the K/V processor 70 receives a reply to the inquiry (secondary drive data) from the monitor server 51 (S107). The K/V processor 70 acknowledges that a K/V storage device of access target is both K/V storage devices 62 and 63.

Then, the K/V processor 70 sends the set instruction (set of key and value) to each of K/V storage device (first secondary drive) 62 and K/V storage device (second secondary drive) 63 (S108 and S109).

Thereby, the key/value pair is stored in each of K/V storage devices 62 and 63 as the backup of K/V storage device 61.

Now, amongst the storage access basic operations with respect to K/V storage device 61, a get operation is explained. Here, the term "get" means a read operation of the storage access client 43 by which data (value) stored in K/V storage device 61 are read. FIG. 4 shows an example of a get operation.

The storage access client 43 first sends a primary drive inquiry to the monitor server 51 using the key as the parameter as performed in the set operation (cf. FIG. 3) and specifies which K/V storage device is the primary drive storing the key and the value associated with the key (S201).

Using the key structure managed therein, the monitor server 51 retrieves the primary drive storing the key and sends the retrieval result to the storage access client 43.

Then, the storage access client 43 receives a reply to the inquiry from the monitor server 51 (S202). Thereby, the storage access client 43 can acquire the data of the K/V storage device of the access target.

Then, the storage access client 43 sends a get (key) as a get request to the target K/V storage device (S203). In the present embodiment, the get (key) is sent to K/V storage device 61.

The K/V processor 70 of K/V storage device 61 retrieves the key stored in SSD 201 and SSD 202 based on the get (key) received from the storage access client 43 (S204), and acquires the entry structure which is described later.

Then, the K/V processor 70 reads the values stored in the positions indicated by pointers of HDD 101 and HDD 102 indicated by the entry structure (S205).

Then, the K/V processor 70 sends a reply to the storage access client 43 (S206). That is, the read value is sent to the storage access client 43. Note that, if the key processor 70 does not hit a key in SSDs 201 and 202 through the retrieval, an error reply or a value-missing reply is sent to the storage access client 43. The substance of the reply can be determined optionally based on the design of the protocol.

Then, if the primary drive has failed, there are two get operations to be taken (first get operation and second get operation) as follows. FIG. 5 shows an example of a first get operation and FIG. 6 shows an example of a second get operation. Note that the second get operation (cf. FIG. 6) is performed if the primary drive has failed in the present embodiment. Here, the failure in the present embodiment means that the primary drive cannot read the value associated with the key transmitted from the storage access client 43 from HDD 101 or HDD 102. The detail of the failure will be exemplified later.

FIG. 5 shows an example of the first get operation which is performed if a primary drive has failed.

Steps S301 to S304 are the same as the aforementioned steps S201 to S204, and thus, the explanation thereof will be omitted (cf. FIG. 4).

If the K/V processor 70 fails to read a value from HDD 101 or HDD 102 in the above value reading process, a failure in HDD 101 or HDD 102 is acknowledged (S305). If the failure in HDD 101 or HDD 102 is acknowledged, the K/V processor 70 sends an error reply to the storage access client 43 (S306). Thereby, the storage access client 43 can acknowledge that a value is unreadable from the K/V storage device (primary drive) or HDD 101 or 102 has failed.

Then, the storage access client 43 sends a secondary drive inquiry to the monitor server 51 using the key as the parameter (S307).

As described above, the monitor server 51 retrieves the secondary drive which stores the key using the managed key structure and sends the retrieval result to the storage access client 43.

Then, the storage access client 43 receives a reply to the inquiry from the monitor server 51 (S308). Thereby, the storage access client 43 acquires the K/V storage device of the access target (secondary drive). In the present embodiment, either K/V storage device 62 or K/V storage device 63 can be the secondary drive. Hereinafter, a case where the reply indicates K/V storage device 62 as the secondary drive will be explained.

Then, the storage access client 43 sends a get (key) as a get request to K/V storage device 62 (S309).

The K/V processor of K/V storage device 62 retrieves the key stored in an SSD of K/V storage device 62 based on the get (key) received from the storage access client 43, and acquires the entry structure. Then, the K/V processor reads the value stored in a pointer of each HDD indicated by the entry structure.

Then K/V storage device 62 sends a reply to the get (key) sent from the storage access client 43 (S310). That is, K/V storage device 62 sends the value read from the HDD to the storage access client 43.

As can be understood from the above, if a failure occurs in the primary drive and a value cannot be read therefrom, the first get operation may be initiated. In this operation, the K/V processor 70 notifies the storage access client 43 that the value is unreadable. The storage access client 43 sends a secondary drive inquiry to the monitor server 51, and based on the inquiry result, sends a get (key) to the K/V processor of K/V storage device 62. The K/V processor reads the value from the secondary drive based on the received command, and sends the read value to the storage access client 43.

Now, the second get operation is explained. FIG. 6 shows an example of the second get operation which is performed if a primary drive has failed.

Steps S401 to S405 in which the K/V processor 70 cannot read a value and acknowledges a failure are performed the same as the aforementioned steps S301 to S305 of the first get operation, and thus, the explanation thereof will be omitted (cf. FIG. 5).

If the K/V processor 70 acknowledges a failure in HDD 101 or HDD 102 (S405), the K/V processor 70 sends a secondary drive inquiry to the monitor server using the key as the parameter (S406).

Then, the K/V processor 70 receives a reply to the inquiry from the monitor server 51 (S407). Thereby, a K/V storage device as an access target (secondary drive) of the K/V processor 70 is clarified. In the present embodiment, the secondary drive may be either K/V storage device 62 or K/V storage device 63. Hereinafter, as in the case of the first get operation, a case where the reply indicates K/V storage device 62 as the secondary drive will be explained.

Then, the K/V processor 70 sends a get (key) as a get request to K/V storage device 62 (S408).

The K/V processor of K/V storage device 62 retrieves the key stored in an SSD of K/V storage device 62 based on the get (key) received from K/V storage device 61, and acquires the entry structure. Then, the K/V processor reads the value stored in a pointer of each HDD indicated by the entry structure.

Then, K/V storage device 62 sends a reply to the get (key) sent from K/V storage device 61 (S409). That is, K/V storage device 62 sends the value read from the HDD to K/V storage device 61.

Note that, if the K/V processor of K/V storage device 62 does not hit a key in an SSD thereof, the K/V processor sends back an error reply or a value-missing reply to the K/V processor 70 of K/V storage device 61.

In the present embodiment, two secondary drives (K/V storage devices 62 and 63) are provided with the storage system 5. Therefore, if the K/V processor of K/V storage device 61 receives an error reply or a value-missing reply from K/V storage device (first secondary drive) 62, the K/V processor 70 sends an additional secondary drive (second secondary drive) inquiry to the monitor server 51. Then, the K/V processor 70 of K/V storage device 61 may send a get (key) to the additional secondary drive (K/V storage device 63) to receive the value therefrom. Thereby, even if the value cannot be read from K/V storage device 61 or K/V storage device 62, the number of accesses between the K/V processor 70 and the storage access client 43 can be reduced and the work of the storage access client 43 can be reduced. Such a process may be repeated by the number of secondary drives in the system.

The K/V processor 70 of K/V storage device 61 receives a reply to the get (key) from K/V storage device 62, and reregisters the key/value pair based on the received value.

Specifically, the K/V processor 70 stores the value in each of HDDs 101 and 102 (S410), and updates the save position (storage position) of the value in each of SSDs 201 and 202 (S411).

Then, the K/V processor 70 sends a reply to the storage access client 43 (S412). That is, the K/V processor 70 sends the value received from K/V storage device 62 to the storage access client 43.

As can be understood from the above, if a failure occurs in a primary drive and a value cannot be read therefrom, the second get operation may be initiated. In this operation, the K/V processor 70 sends a secondary drive inquiry to the monitor server 51 and reads data (value) from the secondary drive using the inquiry result. That is, in the second get operation, if a value is unreadable because of the failure in the primary drive, the K/V processor 70 can specify the secondary drive without an intervention of the storage access client 43 and read the value therefrom.

Note that, although the second get operation is explained in which a key/value pair received from K/V storage device 62 is reregistered, no limitation is intended thereby. The reregistration process may be skipped and the key/value pair may be sent to the storage access client 43.

Furthermore, although the process (second get operation) explained with reference to FIG. 6 is performed when the primary drive has failed in the present embodiment, no limitation is intended thereby. The first get operation and the second get operation may be selected to suitably correspond to conditions (kinds) of failure in HDD 101 and HDD 102.

For example, if all the HDDs have failed (because of failures causing all of the HDDs to be inaccessible such as a head malfunction, a power failure, or the like), the reregistration operation of the key/value pair (second get operation: S410 and S411 in FIG. 6) of the present embodiment may not be performable. Therefore, if the K/V processor 70 acknowledges a whole failure of the HDDs, the first get operation may be performed as explained with reference to FIG. 5.

Now, the internal structure of the K/V processor 70 is explained. FIG. 7 shows an example of the internal structure of the K/V processor 70.

The K/V processor 70 includes an Ethernet interface (I/F) 71, TCP/IP communication processor 72, K/V protocol processor 73, K/V data manager 74, index manager 75, value I/O unit 76, RAID processor 77, logic block 78A, logic block 78B, storage interfaces (I/F) 79A to 79D, I/O error manager 80, and substitute inquiry unit 81.

The Ethernet I/F 71 controls the communication with the monitor server 51 and the process server 4 connected through Ethernet.

The TCP/IP communication processor 72 controls the TCP/IP communication.

The K/V protocol processor 73 performs a communication process (protocol) to manage the key/value pair process (including, for example, get, put, and the like). In the present embodiment, the protocol is a memcached protocol; however, it is not limited thereto.

Based on the instruction from the K/V protocol processor 73, the K/V data manager 74 performs read/write of the key and value with the index manager 75. Furthermore, the K/V data manager 74 performs read/write of the value with a value I/O unit 76.

The index manager 75 is provided with a dynamic random access memory (DRAM) 75A. The index manager 75 includes a key hash table and an offset maintenance structure. The key hash table and the offset maintenance structure will be described later with reference to FIG. 9.

When receiving an instruction of registration (storing) of the save position (storage position) of the value from the K/V data manager 74, the index manager 75 generates an entry structure using management data in the instruction, and requests the RAID processor 77 to read the entry structure. Furthermore, when receiving an instruction of read of the save position of the value from the K/V data manager 74, the index manager 75 requests the RAID processor 77 to read the data of the entry structure. The entry structure will be described later with reference to FIG. 9.

The value I/O unit 76 performs read/write of the value based on the designation of devid, offset, and length. Specifically, the value I/O unit 76 determines the storage I/F based on the devid, calculates the sector and the number of the sectors (or the number of the reads) based on the offset and length, and reads the value (data) from HDDs 101 and 102 through storage I/Fs 79A and 793. Here, the sector is a unit of a storage area of an HDD.

The RAID processor 77 and a plurality of logic blocks 78A and 78B compose redundant arrays of independent disks (RAID).

Logic blocks 78A and 78B perform read/write of the designated block number. Logic blocks 78A and 78B include a memory (not shown) each inside and may cache the read/write of SSDs 201 and 202 through storage I/Fs 79C and 79D, respectively. Furthermore, in the present embodiment, logic blocks 78A and 78B have each sector of HDDs 101 and 102 associated with one block; however, no limitation is intended thereby, and a plurality of sectors may be associated with one block instead.

Note that, in the present embodiment, logic blocks corresponding to storage I/Fs 79A and 79B are not interposed and only logic blocks 78A and 78B corresponding to storage I/Fs 79C and 79D are interposed; however, no limitation is intended thereby. In addition to the logic blocks corresponding to storage I/Fs 79C and 79D, logic blocks corresponding to storage I/Fs 79A and 79B may be interposed therein.

Storage I/Fs 79A to 79D are each used for the connection with the storage unit. The storage I/F is, for example, Serial ATA (SATA) or Serial Attached SCSI (SAS). In the present embodiment, storage I/Fs 79A, 79B, 79C, and 79D control the data input/output of HDDs 101 and 102, and SSDs 201 and 202.

The I/O error manager 80 includes an I/O error record table. The I/O error record table will be described later with reference to FIGS. 11 and 12.

The I/O error manager 80 performs error registration of each sector based on error data sent from the value I/O unit 76. Specifically, the I/O error manager 80 stores the error occurrence and error types in the I/O error record table of each sector.

Furthermore, in response to an error inquiry sent from the value I/O unit 76, the I/O error manager 80 sends data of the error occurrence to the value I/O unit 76 based on the I/O error record table.

The substitute inquiry unit 81 registers a substitute inquiry request sent from the K/V data manager 74. The substitute inquiry unit 81 uses the registration as a trigger to perform a series of processes such as sending a get transmission request to a secondary drive, receiving a reply to the get transmission request, sending a substitute inquiry completion, and performing a put process. Here, the put process is a command performed when a value is received from another K/V storage device and by which a key/value pair with respect to the value is reregistered. Note that the series of above processes will be detailed later with reference to FIGS. 14 and 15.

Next, the data management structure of the index manager 75 will be explained.

Figure 8:
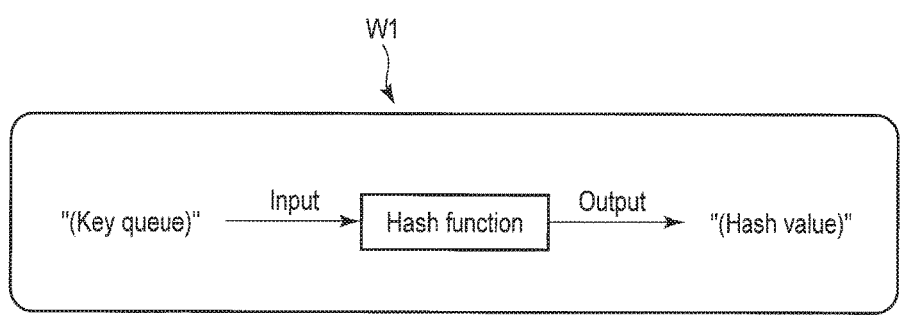
FIG. 8 shows an example of a flow of a hash value calculation of the embodiment.

FIGS. 8 and 9 show an example of the data management structure of the index manager 75. FIG. 8 shows an example of a flow of a hash value calculation, and FIG. 9 shows an example of a key hash table.

FIG. 8 shows a flow W1 to calculate a hash value executed by the index manager 75. As shown in FIG. 8, if a key queue is input to the index manager 75, the index manager 75 calculates and obtains the hash value using the key queue and a hash function.

FIG. 9 shows an example of a key hash table. A key hash table W2 is a hash value sequence of a result of the key queue input to the hash function (cf. FIG. 8). Furthermore, the hash value is a pointer to an offset maintenance structure D11 in the key hash table W2. Therefore, the key hash table W2 is a management table indicative of the pointer to offset maintenance structure D11.

Offset maintenance structure D11 maintains an offset of an entry structure D21 (entry_offset) and a pointer to a next entry structure (next_pointer) used to form a list in case of the same hash value in different key queues. For example, offset maintenance structure D11 maintains <entry_offset=aaa, next_pointer=null> as a pointer with respect to a hash value 0x829a.

Entry structure D21 is maintained in SSDs 201 and 202 of a leading offset address indicated by the entry_offset. Entry structure D21 maintains a key queue (for example, key=20150102), value length (length=5), ID of HDD 101 or HDD 102 maintaining the value (devid=0), leading offset address of the HDD storing the value (HDD offset=0x00123456), error detection code of a value content (using CRC and hash value) (CheckCode=d9a3 . . . ), devid in a case where the value is cached outside the HDDs (cache_devid), cache offset (cache_offset), and the like.

FIG. 10 shows an example of a relationship between various management data, values, and storage locations of these items (DRAM 75A, SSD 201, SSD 202, HDD 101, and HDD 102).

As shown in FIG. 10, the DRAM 75A maintains the key hash table W2 and offset maintenance structures D11 and D12. Furthermore, SSD 201 includes partitions P11 and P12, and SSD 202 includes partitions P21 and P22. With partitions P11 and P21 or partitions P12 and P22, SSDs 201 and 202 are made redundant by the RAID or the like. SSD 201 and SSD 202 structured as above maintain entry structures D21, D22, and D23. HDD 101 and HDD 102 store the value.

Therefore, for example, the key hash table W2, offset maintenance structure D11, entry structure D21, and value are associated with each other in this order.

Note that, in the present embodiment, the key hash table W2 and offset maintenance structures D11 and D12 are stored (maintained) in the DRAM 75A, entry structure D23 is stored (maintained) in SSDs 201 and 202, and the value is stored (maintained) in HDD 101 or HDD 102; however, the storage locations of the data are not limited thereby.

Furthermore, in the present embodiment, the entry structure is recorded in SSDs 201 and 202, and the value is recorded in HDD 101 or HDD 102, both in a log format (write-once type). Data recording using an ordinary file system is performed along with a metadata update for the file system management. The write of the recorded data and the metadata must be performed consistently, and a large number of random write operations are performed over a wide range of sectors. In view of the consistency, the HDDs and SSDs are both vulnerable to an unexpected event such as a sudden shutdown. In view of a large number of random write operations, internal SSD data write operations tend to increase possibly causing the SSD media to wear out, and HDD head arm operations rend to increase possibly causing the HDD mechanism to wear out. On the other hand, the log format recording only performs additional writes, and the SSDs and the HDDs do not wear out for such reasons. Therefore, the log format recording is effective in reducing the failure ratio of SSDs 201 and 202 and HDDs 101 and 102.

Figure 11:
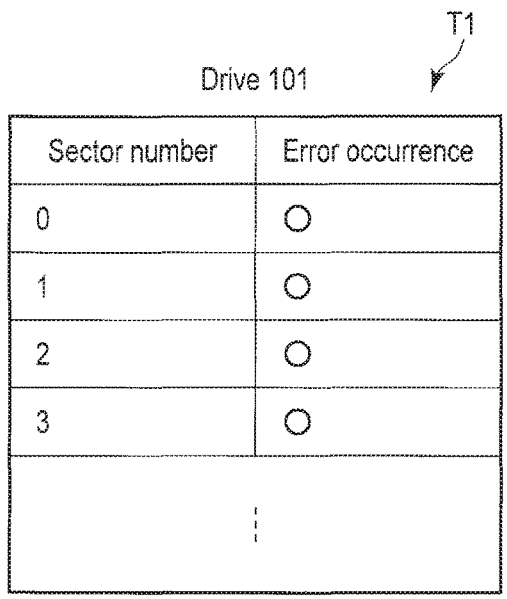
FIG. 11 shows an example of an I/O error record table of the embodiment.
Figure 12:
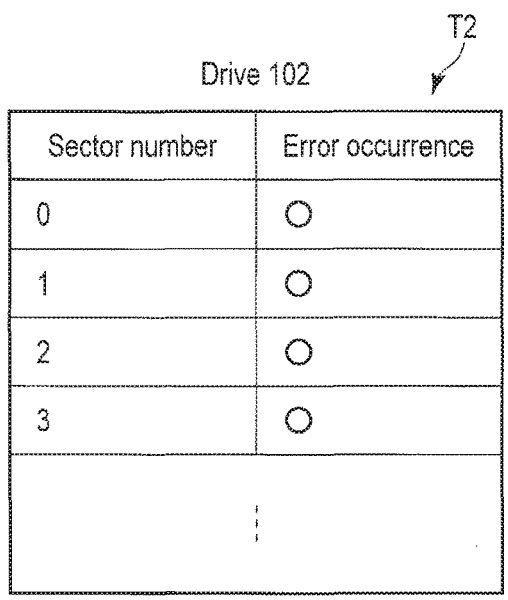
FIG. 12 shows another example of the I/O error record table of the embodiment.

Now, the I/O error table managed by the I/O error manager 80 is explained. FIG. 11 and FIG. 12 show examples of the I/O error record table. FIG. 11 shows an I/O error record table T1 of drive number 101, that is, HDD 101. FIG. 12 shows an I/O error record table T2 of drive number 102, that is, HDD 102.

As shown in FIGS. 11 and 12, I/O error record tables T1 and T2 include a sector number field and an error occurrence field which are associated with each other.

Note that the ○ symbol in the error occurrence field indicates that there is no error in the corresponding sector. This is an initial value which indicates that a regular reply is received from storage I/Fs 79A and 79B.

Note that, although the depiction is omitted, the error occurrence field will indicate symbols such as Δ, *, and x. They indicate the following.

The Δ symbol indicates that data are readable through storage I/Fs 79A and 79B but a bit error is detected by a check code determination or a bit error is reported in reading through storage I/Fs 79A and 79B.

The * symbol indicates a timeout. Specifically, this symbol indicates that a reply from storage I/Fs 79A and 79B is delayed for a certain period with respect to the value I/O unit 76 and determined to be a timeout.

The x symbol indicates an error. Specifically, this symbol indicates that an error is replied from storage I/Fs 79A and 79B with respect to the value I/O unit 76.

Note that, in the present embodiment, the I/O error manager 80 determines whether or not an error exists sector by sector; however, no limitation is intended thereby. The I/O error manager 80 may manage the failure of the whole HDD structure (failures causing all of the HDDs to be inaccessible such as a head malfunction, a power failure, or the like). With the error management of HDDs 101 and 102 performed as above, the value I/O unit 76 can determine whether or not a failure exists in each HDD unit.

Now, an example of an internal process of the K/V processor 70 which is performed if there is a failure in a primary drive in a second get operation is explained with reference to FIGS. 13 to 19.

FIG. 13 shows an example of the data management structure in the initial state of the second get operation.

As shown in FIG. 13, a hash value 0x1230 (pointer) of the key hash table W2 indicates <entry_offset=0x3000, next_pointer=null> of offset maintenance structure D11. Here, 0x3000 of entry structure D21 contains <key=20150303, length=5, devid=0, HDD offset=0x00000400, CheckCode=45793d862ee49ff7759cf6 c5e35ab7cb, cache_devid=null, cache_offset=nulldearu>. Furthermore, 0x00000400 of HDD 101 contains a value "Rainy".

FIGS. 14 and 15 each show an example of a process flow performed in the K/V processor 70 in the second get operation. FIG. 14 shows an example of the process flow where the K/V processor 70 receives a get (key) from the storage access client 43 and performs a substitute inquiry. FIG. 15 shows an example of the process flow where the K/V processor 70 receives a value using a result of the substitute inquiry and sends the value to the storage access client 43. Note that DRAM 75A is omitted in both FIGS. 14 and 15.

As shown in FIG. 14, the K/V protocol processor 73 receives a get (key) through Ethernet I/F 71 and TCP/IP communication processor 72 (S501). Then, the K/V protocol processor 73 instructs the K/V data manager 74 to perform a get process (parameter: key) (S502).

Being instructed to perform the get process, the K/V data manager 74 instructs the index manager 75 to perform the reading of the value position (parameter: key) (S503). Based on this instruction, the index manager 75 reads entry structure D21 (parameter: offset), and passes a read position of the value to the RAID processor 77 (S504).

Then, the RAID processor 77 reads a logical block based on the read position passed from the index manager 75 (parameter: logical block number), and passes the logical block number to each of logic blocks 78A and 78B (S505).

Logic blocks 78A and 78B read sectors from SSDs 201 and 202 through storage I/Fs 79C and 79D using the logical block number passed from the RAID processor 77 (parameter: sector number) (S506). The sector number read as above, that is, the save position (storage position) of the value associated with the key in each HDD is acquired by the K/V data manager 74.

Then, the K/V data manager 74 instructs the value I/O unit 76 to read the value (parameter: devid, offset, and length) using the acquired sector number (S507).

When receiving the value read instruction from the K/V data manager 74, the value I/O unit (determination unit) 76 sends an inquiry about whether or not an error is in the value read position (parameter: devid, and sector number) to the I/O error manager 80 (S508). Based on this inquiry result, the value I/O unit 76 determines whether or not there is a predetermined failure causing the value unreadable in HDD 101 or 102. Here, the predetermined failure means, in the present embodiment, that any of a bit error represented by Δ, a timeout represented by *, and an error reply represented by x is recorded in error record tables T1 and T2.

The I/O error manager (manager) 80 manages each sector (predetermined storage area) to specify whether or not the value stored in HDDs 101 and 102 is readable. Specifically, the I/O error manager 80 determines whether or not an error is in the inquired position using error record tables T1 and T2, and passes a determination result to the value I/O unit 76. In this process explanation, a case where there is no error in the inquired position is explained. Note that, if an error is acknowledged, data indicative of any of a bit error represented by Δ, a timeout represented by *, and an error reply represented by x are sent to the value I/O unit 76, for example.

When receiving a reply indicative of no error from the I/O error manager 80, the value I/O unit 76 reads the value from, for example, the sector of HDD 101 through storage I/F 79A (parameter: devid and sector number) (S509).

Now, a case where HDD 101 has failed and the data cannot be read therefrom is explained. In that case, the value I/O unit 76 instructs the I/O error manager 80 to register the error of the sector (parameter: devid, sector number, and error type) (S510). Therefore, an error acknowledgement is registered in the sector of error record table T1. Furthermore, the K/V data manager 74 registers a substitute inquiry in the substitute inquiry unit 81 (parameter: key) (S511).

The substitute inquiry unit 81 sends an inquiry about primary data (specific data) used to specify K/V storage devices 62 and 63 to K/V storage device 61 and the monitor server 51 which manages K/V storage devices 62 and 63 storing the same value as that of K/V storage device 61.

Specifically, when the substitute inquiry is registered by the K/V data manager 74, the substitute inquiry unit 81 instructs the K/V protocol processor 73 to perform a get transmission request (parameter: key) (S512). When receiving the instruction of the get transmission request (parameter: key), the K/V protocol processor 73 sends the key to the monitor server 51 through the TCP/IP communication processor 72 and Ethernet I/F 71 (S513). Thereby, K/V storage device 61 sends a secondary drive inquiry to the monitor server 51.

Note that, in the present embodiment, an inquiry process is a process to be performed if the K/V processor cannot read a value from HDD 101 or 102, the process to send primary drive data (specific data) which specify either K/V storage device 61 or K/V storage device 62 to the monitor server 51 which manages K/V storage devices 62 and 63 storing the same value as that of K/V storage device 61. In the present embodiment, the processes executed in K/V storage device 61 for the primary drive data inquiry to the monitor server 51 are all included in the inquiry process. In the present embodiment, the inquiry process includes, for example, the K/V data manager 74 registering the substitute inquiry in the substitute inquiry unit 81 (S511), the K/V data manager 74 sending the get transmission request to the K/V protocol processor 73 (S512), and the K/V protocol processor 73 sending the key to the monitor server 51 through the TCP/IP communication processor 72 and Ethernet I/F 71 (S513).

Here, the monitor server 51 retrieves a secondary drive storing the key using the key structure managed therein, and sends a retrieval result (data specifying the secondary drive) to K/V storage device 61. The substitute inquiry unit 81 acquires a reply to the inquiry (specific data specifying the secondary drive) through the Ethernet I/F 71, TCP/IP communication processor 72, and K/V protocol processor 73 (S514).

Then, the substitute inquiry unit 81 has the K/V protocol processor 73 register a get (key) transmission request in the K/V storage device (secondary drive) specified by the secondary drive data.

Then, the K/V protocol processor 73 (processor) sends the get (key) to K/V storage device 62 through the TCP/IP communication processor 72 and Ethernet I/F 71 (S515).

Note that, in the present embodiment, a send process is a process to send a key (first data) to K/V storage device 62 or K/V storage device 63 based on the primary drive (specific data) acquired by the aforementioned inquiry process. In the present embodiment, the processes executed in K/V storage device 61 to send the key to K/V storage device 62 or K/V storage device 63 are all included in the send process. In the present embodiment, the send process includes, for example, the substitute inquiry unit 81 having the K/V protocol processor 73 register the get (key) transmission request in the K/V storage device (secondary drive) specified by the secondary drive data, and the K/V protocol processor 73 sending the get (key) to K/V storage device 62 through the TCP/IP communication processor 72 and Ethernet I/F 71 (S515).

As above, if the get (key) is sent from the primary drive to the secondary drive, the value corresponding to the key in the secondary drive is read by a predetermined HDD. The read value is sent to K/V storage device (primary drive) 61 from K/V storage device (secondary drive) 62.

Next, a process performed when K/V storage device 61 receives the value from K/V storage device 62 is explained with reference to FIG. 15.

As shown in FIG. 15, the substitute inquiry unit 81 receives an inquiry result (S516). Specifically, the substitute inquiry unit 81 receives the value sent from K/V storage device (secondary drive) 62 through the Ethernet I/F 71, TCP/IP communication processor 72, and K/V protocol processor (processor) 73.

Note that, in the present embodiment, a reception process is a process to receive a value associated with a key sent from K/V storage device 62 or 63 corresponding to the key sent by the above send process. In the present embodiment, the processes executed in K/V storage device 61 to receive the value sent from K/V storage device 62 or 63 are all included in the reception process. In the present embodiment, the reception process includes, for example, the substitute inquiry unit 81 receiving the value sent from K/V storage device 62 through Ethernet I/F 71, TCP/IP communication processor 72, and K/V protocol processor 73.

Then, the substitute inquiry unit 81 notifies the K/V data manager 74 that the substitute inquiry has been completed (S517).

Then, the substitute inquiry unit 81 instructs the K/V data manager 74 to perform a put process (S518). Here, the put process is a process of the substitute inquiry unit 81 to pass data (key, length, and value) to the K/V data manager 74 and to register a key/value pair therein.

Specifically, the K/V data manager (storage control unit) 74 stores the value received from K/V storage device 62 in HDDs 101 and 102 to be associated with the key. The K/V data manager 74 instructs the value I/O unit 76 to perform a value write (parameter: devid, offset, length, and value) (S519).

On receiving this instruction, the value I/O unit 76 sends an error inquiry to the I/O error manager 80 (parameter: devid and sector number) (S520). If the result of the error inquiry shows that there is no error in the sector, the value I/O unit 76 performs a sector write to HDD 101 through storage I/F 79A (parameter: devid, sector number, and value) (S521).

Then, when receiving a notification of the completion of the value write from the value I/O unit 76, the K/V data manager 74 instructs the index manager 75 to register a save position (storage position) of the value (parameter: key, length, devid, HDD offset, and the like) (S522).

The index manager 75 performs a write of an entry structure to the RAID processor 77 (parameter: offset, e_length, and contents) (S523). Here, the contents are the contents of the entry structure. The contents of the entry structure include a key queue (for example, key=20150102), value length (length=5), ID of HDD 101 or HDD 202 maintaining the value (devid=0), leading offset address of the HDD storing the value (HDD offset=0x00123456), error detection code of a value content (using CRC and hash value) (CheckCode=d9a3 . . . ), devid in a case where the value is cached outside the HDDs (cache_devid), cache_offset (cache_offset), and the like (cf. FIG. 9).

The RAID processor 77 performs a logical block write to each of logic blocks 78A and 78B (parameter: logical block number and contents) (S524). Logic blocks 78A and 78B perform a sector write (parameters: sector number and contents) to SSDs 201 and 202, respectively, through storage I/Fs 79C and 79D (S525).

After the write has been completed in SSDs 201 and 202, the K/V data manager instructs the K/V protocol processor 73 to send a get reply (value) (S526). Then, the K/V protocol processor (processor) 73 sends the value to the storage access client 43 through the TCP/IP communication processor 72 and Ethernet I/F 71 (S527). Thereby, K/V storage device 61 sends a reply to the get (key) to the storage access client 43.

FIG. 16 shows an example of a data management structure at the time of the second get operation.

Comparing FIG. 16 to FIG. 13 showing the initial state of the second get operation, the HDD offset has been changed. That is, the value "Rainy" was stored in the HDD offset=0x00000400 in FIG. 13 whereas the value is stored in the HDD offset=0x00000600. That is, the save position of the value corresponding to the key 0x1230 has been changed to the save position of the value received from K/V storage device 62.

FIG. 17 shows an example of data arrangement at the time of execution of the second get operation.

As shown in FIG. 17, the key hash value 0x1230 is associated with the value "Rainy" through offset maintenance structure D11 and entry structure D21. Since the value "Rainy" (HDD offset=0x00000400) before the second get operation as in FIG. 13 is now unreadable, entry structure D21 is associated with the value "Rainy" (HDD offset=0x00000600) which is stored after the second get operation.

Figure 18:
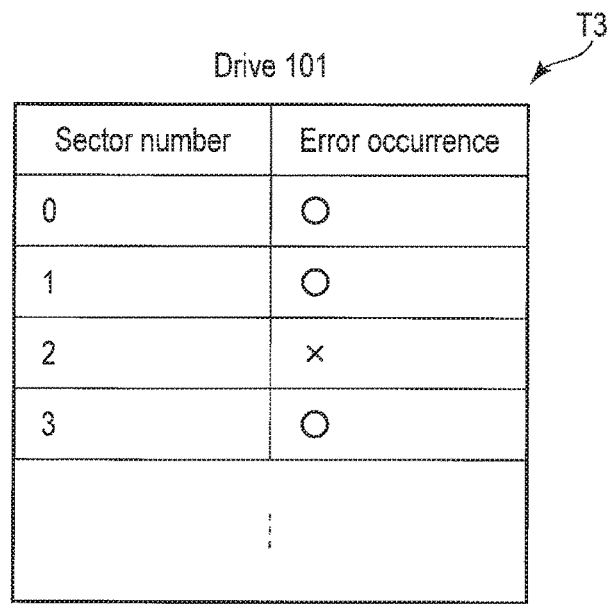
FIG. 18 shows an example of an error record table at the time of execution of the second get operation of the embodiment.
Figure 19:
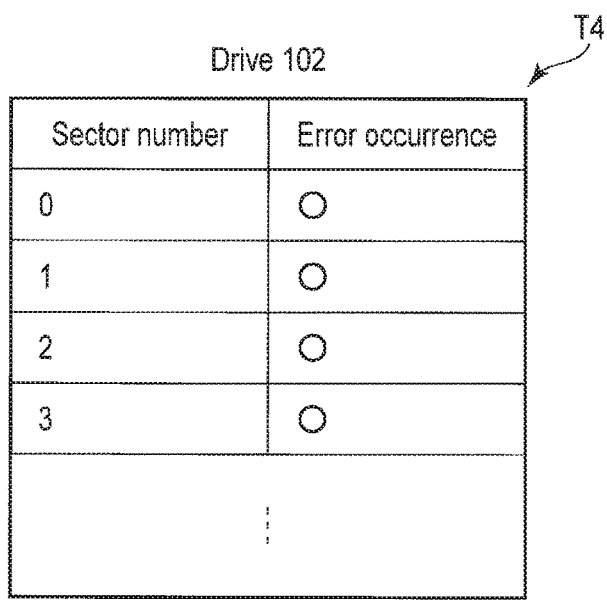
FIG. 19 shows an example of another error record table at the time of execution of the second get operation of the embodiment.

FIGS. 18 and 19 show examples of error record tables T3 and T4 of the I/O error manager 80 at the time of execution of the second get operation.

FIG. 18 shows error record table T3 in which the sector corresponding to the value "Rainy" (HDD offset=0x00000400) before the operation (sector number 2 of drive 101) has an error occurrence field of x. Note that, since an error is not detected in error record table T4 of FIG. 19, it is the same as error record table T2 in FIG. 12.

K/V storage device 61 structure as above receives a get (key) through the storage access client 43 if, for example, a read command is sent from the data processor 1. At that time, if the value cannot be read from HDD 101, the second get operation is performed.

Specifically, when receiving a get (key), the K/V processor 70 of K/V storage device 61 initially determines whether or not a failure is in HDD 101 storing a value corresponding to the key. In the present embodiment, the K/V processor 70 determines whether or not there is an error in the sector of the save position (storage position) of the value referring to error record table T1.

Then, when determining that HDD 101 has failed, the K/V processor 70 inquires K/V storage device 61 and the monitor server 51 which manages K/V storage device 62 storing the data including the value stored in K/V storage device 61 to send the specific data used to specify K/V storage device 62.

Then, the K/V processor 70 sends a get (key) to K/V storage device 62 specified by the specific data acquired by the above inquiry. Then, the K/V processor 70 receives a value corresponding to the key sent from K/V storage device 62. Then, the K/V processor 70 outputs the received value to the data processor 1 as the sender of the key through the process server 4.

By performing the above processes, even if a value corresponding to a key cannot be read because of a failure of the HDD, K/V storage device 61 acquires the value from K/V storage device 62 and sends the value to the data processor 1. Therefore, even if the value cannot be read from the primary drive, the process server 4 (storage access client 43) does not need to send a secondary drive inquiry to the monitor server 51 to inquire the secondary drive. Therefore, processes through the network in the data center 3 (quantity of data) can be reduced, and the load on the network can be reduced.

Furthermore, if a failure occurs in HDD 101, the K/V processor 70 of K/V storage device 61 stores the value received from K/V storage device 62 in HDD 101 (or HDD 102) to be associated with the key.

Therefore, if the K/V processor 70 receives the same key again from the storage access client 43, the K/V processor 70 can read the value corresponding to the key from the key/value pair newly stored. Therefore, K/V storage device 61 does not need to send an inquiry every time a key by which a value cannot be read is received to acquire the value from K/V storage device 62. Therefore, the load on the storage system 5 can be reduced.

Note that, in the present embodiment, SSDs 201 and 202 are made redundant while HDDs 101 and 102 are not; however, no limitation is intended thereby. Both SSDs 201 and 202 and HDDs 101 and 102 may be made redundant. Furthermore, a key storage device and a value storage device may not be made redundant.

Furthermore, in the present embodiment, a K/V storage device includes SSDs 201 and 202 used to store a key (first data) and HDDs 101 and 102 used to store a value (second data); however, the structure is not limited thereto. For example, the present embodiment can be applied to a storage server including a first storage unit which stores first data and a second storage unit which stores second data corresponding to the first data.

Note that, in the present embodiment, a key (first data) is stored in SSD 201 (SSD 202) and a value (second data) is stored in HDD 101 (HDD 102); however, the structure is not limited thereto. For example, a key and a value may be associated with each other and any storage device in the KV storage device may store such associated key and value. Alternatively, for example, a key may be stored in HDD and a value may be stored in SSD. Alternatively, a key and a value may each be stored in storage devices other than SSD and HDD. Here, the other storage device may be a nonvolatile memory, specifically, a resistive random access memory (ReRAM), phase change memory (PCM), magnetoresistive random access memory (MRAM), or ferroelectric random access memory (FeRAM), for example.

Furthermore, in the present embodiment, the KV processor (controller) 70 performs each process when the KV storage device 61 receives a key from the storage access client 43; however, no limitation is intended thereby. For example, the processes performed by the KV processor 70 may partly be performed by a different circuit. Alternatively, the processes may partly be performed by execution of a program (firmware). Such processes to be performed by a circuit or a program instead of the KV processor 70 can be designed optionally.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device configured to communicate with a data processor, a different storage device, and a server configured to manage the storage device and the different storage device, comprising:
   a first storage configured to store first data received from the data processor;
   a second storage configured to store second data associated with the first data; and
   a controller configured to control the first storage and the second storage, wherein the controller comprises:
      a first processor configured to determine, based on the first data from the data processor, whether or not the second storage can read the second data,
      a second processor configured to, in response to determining that the second storage cannot read the second data, receive from the server, without an intervention of the data processor corresponding to the first and second data, specific data used to specify the different storage device, and a third processor configured to:
send the first data to the different storage device based on the specific data received from the server,
receive, in response to sending the first data to the different storage device, the second data from the different storage device, and
output the second data to the data processor, wherein the data processor is a source of the first data.

2. The storage device of claim 1, wherein the first processor determines whether or not the second data can be read using a fourth processor which manages the readability of the second data for each storage area in the second storage.

3. The storage device of claim 2, wherein the controller further comprises a storage controller which has the second storage store the second data received from the different storage device through the third processor, the second data stored to be associated with the first data.

4. The storage device of claim 1, wherein the different storage device to which the third processor sends the specific data comprises a different first storage and a different second storage corresponding to the first storage and the second storage, respectively, and
the first data stored in the first storage of the storage device are secured in the different first storage of the different storage device as a backup, and the second data stored in the second storage of the storage device are secured in the different second storage of the different storage device as a backup.

5. The storage device of claim 1, wherein the server manages a plurality of different storage devices to which the third processor sends the specific data,
each of the different storage devices comprises a different first storage and a different second storage corresponding to the first storage and the second storage, respectively, and
the first data stored in the first storage of the storage device are secured in the different first storage of each of the different storage devices as a backup, and the second data stored in the second storage of the storage device are secured in the different second storage of each of the different storage devices as a backup.

6. The storage device of claim 5, wherein the second processor again performs an inquiry to the server when the third processor cannot receive the second data from a first different storage device, and the third processor sends the first data to a second different storage device based on a result of the inquiry, and receives the second data from the second different storage device.

7. The storage device of claim 6, wherein the controller instructs the different storage devices to repeat an inquiry process by the second processor to the server, a send process of the first data, and a reception process of the second data when the third processor cannot receive the second data from the second different storage device until the different storage devices receive the second data.

8. The storage device of claim 1, wherein the first storage includes a plurality of first storages, and the plurality of first storages store the same first data.

9. The storage device of claim 1, wherein the first data are a key and the second data are a value.

10. The storage device of claim 1, wherein the first storage is a solid-state drive configured to read the first data at a first speed, and the second storage is a hard disk drive configured to read the second data at a second speed which is slower than the first speed.

11. The storage device of claim 2, wherein the second storage is a hard disk drive,
the storage area is a sector which is a structural unit of the hard disk drive,
the fourth processor memorizes whether or not the second data can be read from each sector, and
the first processor performs the determination in each sector using the fourth processor when reading the second data.

12. The storage device of claim 2, wherein the second storage includes one or more hard disk drives, the fourth processor determines whether or not the second data can be read from each hard disk drive, and the first processor performs the determination in each hard disk drive using the fourth processor when reading the second data.

13. The storage device of claim 1, wherein when the controller receives the first data from the data processor and determines that all of the second storage fails, the controller sends a reply to the data processor, and
the data processor inquires of the server about the different storage device storing the second data, which is associated with the first data, receives the specific data indicating the different storage device from the server, sends the first data to the different storage device, and receives the second data, which is associated with the first data, from the different storage device.

14. A storage device communicating with a data processor, a server, and a different storage device, comprising:
a storage configured to store first data; and
a controller configured to control the storage, wherein the controller determines, when an instruction to read the first data from the storage is received from the data processor, whether or not a failure is in a target device from which the first data are read, and
uses, when the failure is in the target device, without an intervention of the data processor corresponding to the instruction and the first data, the server which manages the storage device and the different storage device storing the same data as the first data, to acquire the same data from the different storage device, and outputs the acquired same data to the data processor.

15. The storage device of claim 13, wherein when the controller receives the instruction from the data processor and determines that all of the storage fails, the controller sends a reply to the data processor, and
the data processor inquires of the server about the different storage device storing the same data, which is associated with the first data, receives the specific data indicating the different storage device from the server, sends the instruction to the different storage device, and receives the same data, which is associated with the instruction, from the different storage device.

* * * * *